United States Patent
Lu

(10) Patent No.: US 8,038,468 B2
(45) Date of Patent: Oct. 18, 2011

(54) ADAPTER EQUIPPED WITH A WIRE WINDING AND HOLDING APPARATUS

(75) Inventor: Wen-Ching Lu, Yilan County (TW)

(73) Assignee: Innotrans Technology Co., Ltd., Taipei (TW)

( * ) Notice: Subject to any disclaimer, the term of this patent is extended or adjusted under 35 U.S.C. 154(b) by 138 days.

(21) Appl. No.: 12/652,479

(22) Filed: Jan. 5, 2010

(65) Prior Publication Data

US 2011/0165791 A1    Jul. 7, 2011

(51) Int. Cl.
*H01R 13/72*   (2006.01)

(52) U.S. Cl. ......................... 439/501; 439/528

(58) Field of Classification Search .................. 439/135, 439/640, 164, 15, 131, 501, 528
See application file for complete search history.

(56) References Cited

U.S. PATENT DOCUMENTS

| | | | |
|---|---|---|---|
| 5,691,882 A * | 11/1997 | Ma | 361/679.32 |
| 6,923,666 B1 * | 8/2005 | Liao | 439/172 |
| 7,740,494 B2 * | 6/2010 | Lin et al. | 439/131 |
| 7,887,341 B2 * | 2/2011 | Liao | 439/131 |
| 2008/0076280 A1 * | 3/2008 | Chi et al. | 439/131 |
| 2009/0191735 A1 * | 7/2009 | Lin | 439/131 |

FOREIGN PATENT DOCUMENTS

| | | |
|---|---|---|
| TW | 529822 | 4/2003 |
| TW | M299946 | 10/2006 |
| TW | M350899 | 2/2009 |

* cited by examiner

*Primary Examiner* — Neil Abrams
*Assistant Examiner* — Phuong Nguyen
(74) *Attorney, Agent, or Firm* — Muncy, Geissler, Olds & Lowe, PLLC

(57) ABSTRACT

An adapter equipped with a wire winding and holding apparatus comprises a circuit laying section to hold a conversion circuit, a wire holding section to define a holding space and a wire winder movably held in the holding space. The wire winder includes two conducting wire ends which are extensible and retractable and electrically connected to each other. One of the conducting wire ends is electrically connected to the conversion circuit. Two positioning arms are extended from the same side of the adapter to define the holding space. The wire winder is guided by the two positioning arms and movably pulled out or retracted in the holding space to be anchored. The two positioning arms have respectively an extended laying space communicating with the circuit laying space.

7 Claims, 5 Drawing Sheets

ADAPTER EQUIPPED WITH A WIRE WINDING AND HOLDING APPARATUS

FIELD OF THE INVENTION

The present invention relates to an adapter equipped with a wire winding and holding apparatus that contains a movable wire winder separable or engageable with the adapter.

BACKGROUND OF THE INVENTION

These days information products are widely used in the society. Adapters are commonly adopted to mate various electronic products to provide stable electric power. The conventional adapter includes an input end and an output end, such as one disclosed in R.O.C. patent No. 529822 entitled "Adapter equipped with a power indication light" The adapter is made at a size and shape to make carrying easier to be sold or carried with electronic products. It also has a power cord at one end that can be bundled to facilitate storing. However, wire storage often is a problem on the general adapter. To resolve the problem of wire storage, R.O.C. patent No. M350899 entitled "Adapter equipped with unit winding" proposes a structure in which a wire winder (winding disc, helical spring or the like) is provided between an upper cover and a lower cover of the adapter in addition to circuit elements to retract the conducting wire of the adapter. While the adapter with the wire winder thus formed can keep the exterior neat and tidy, and also provide wire winding function, the interior space is limited and a cooling space is needed. The wire winder hinders air circulation inside and cooling capability of the adapter suffers. Moreover, the adapter with greater power contains more voluminous circuit elements and requires larger insulation space. Hence having a built-in wire winder in a large power adapter is not advisable.

In order to free the wire winder from occupying the interior space of the adapter, other techniques installing the wire winder outside the adapter have been proposed. For instance, R.O.C. patent No. M299946 entitled "Concealable and extensible adapter plug structure" discloses an adapter containing a concealable and extensible plug, and also including a wire winder to wind a conducting wire at another end of the adapter. Although the wire winder is located outside the adapter without occupying the interior space needed for cooling and holding circuit elements, there is no holding place to hold and fix the wire winder. The wire winder is dangling and entangling outside the adapter and creates a lot of annoyance and trouble to users. Hence there are still rooms for improvement.

SUMMARY OF THE INVENTION

In view of the disadvantages of the aforesaid conventional techniques, the primary object of the present invention is to provide an adapter coupled with a wire winder and supply a space outside the adapter to hold and fasten the wire winder.

The present invention provides an adapter equipped with a wire winding and holding apparatus that includes a circuit laying section to hold a conversion circuit and a wire holding section containing a holding space, and a wire winder can be movably held in the holding space. The wire winder includes two conducting wire ends that are extensible and retractable and connected electrically. One conducting wire end is electrically connected to the conversion circuit. The adapter further has two positioning arms extended from the same side to define the holding space so that the wire winder can be directed by the two positioning arms to be movably pulled out of the holding space or retracted in the holding space to be anchored. The two positioning arms have respectively an extended laying space to hold the elements of the conversion circuit to expand the usable circuit board area or reduce the density of the circuit element of the conversion circuit to improve cooling effect. The extended laying space further can hold a cooling set, or at least a portion of the positioning arms can be made of conductive metallic material to increase cooling area. The wire winder also can be directed and clipped by the two positioning arms to slide in the holding space while the conducting wire is retracted so that the wire winder can be separated and anchored in the holding space to prevent entangling of the wire winder and the conducting wire to form a neat and tidy condition to make handling easier.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
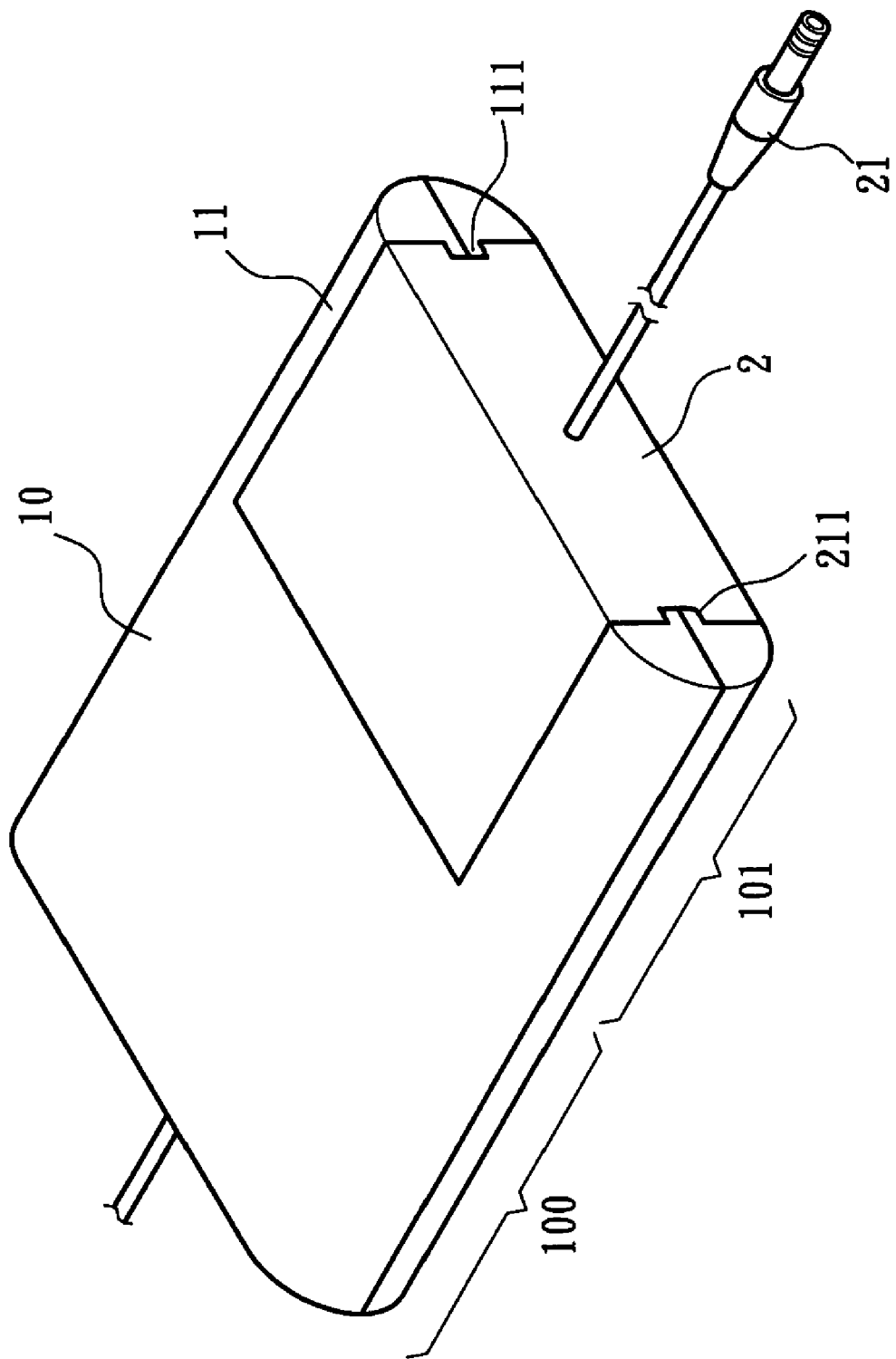
FIG. 1 is a perspective view of the adapter and wire winder of the present invention.
Figure 2:
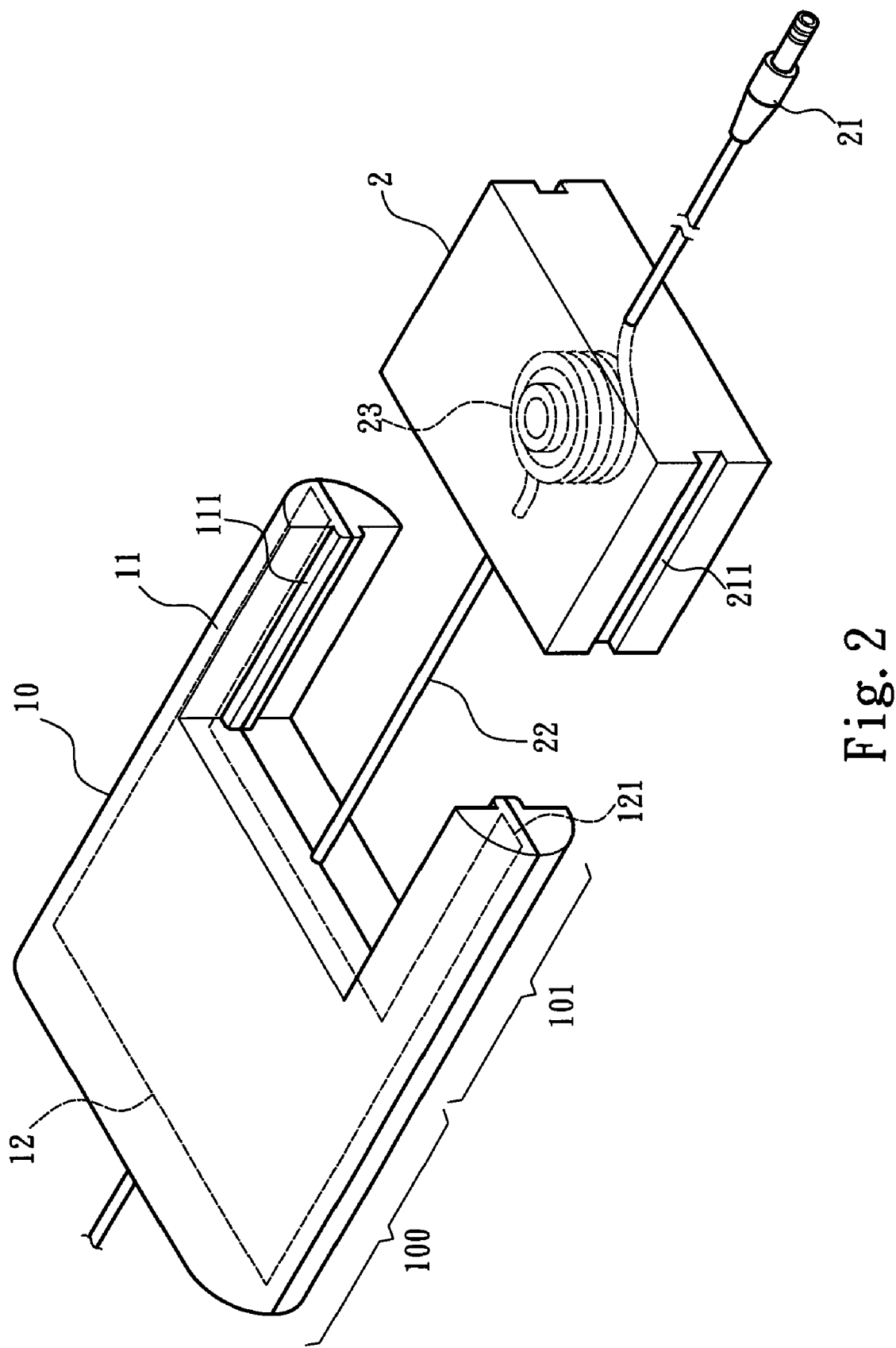
FIG. 2 is another perspective view of the adapter and wire winder of the present invention.

Please refer to FIGS. 1 and 2, the present invention aims to provide an adapter equipped with a wire winding and holding apparatus. It comprises a circuit laying section 100 to hold a conversion circuit 12 and a wire holding section 101 containing a holding space. The circuit laying section 100 includes a body 10 and the conversion circuit 12 held in a circuit laying space formed in the body 10. The wire holding section 101 includes two positioning arms 11 to define the holding space and a wire winder 2 movably held in the holding space. The wire winder 2 has a first conducting wire end 21 and a second conducting wire end 22 that are extensible and retractable and electrically connected. One of the first and second conducting wire ends 21 and 22 is electrically connected to the conversion circuit 12 (in FIGS. 1 and 2 the second conducting wire end 22 is electrically connected to the conversion circuit 12). Hence the conducting wire of the adapter can be extended through the wire winder 2. The technique for extension and retraction of the first and second conducting wire ends 21 and 22 is known in the art, thus details are omitted herein. It is to be noted that a wire winding apparatus 23 shown in FIG. 2 is only for illustrative purpose, and is not the limitation of the invention. The positioning arms 11 are extended from the same side of the body 10, and form the holding space between them to hold the wire winder 2. Moreover, the second conducting wire end 22 is extended into the body 10 to connect electrically to the conversion circuit 12. With the second conducting wire end 22 fastened to the conversion circuit 12, the first conducting wire end 21 can be pulled away with the wire winder 2 and also be retracted by directing of the two positioning arms 11 and returns to the holding space to be anchored. Thus the wire winder 2 can be movably held in the holding space. To facilitate returning of the wire winder 2, the positioning arms 11 and the wire winder 2 have respectively at least one first directing portion 111 and at least one second directing position 211 formed on the connection sides thereof. The first and second directing portions 111 and 211 can be coupled to guide the wire winder 2 to slide into the holding space between the two positioning arms 11 so that the wire winder 2 can be wedged in the holding space in a desired angle and direction.

Figure 3:
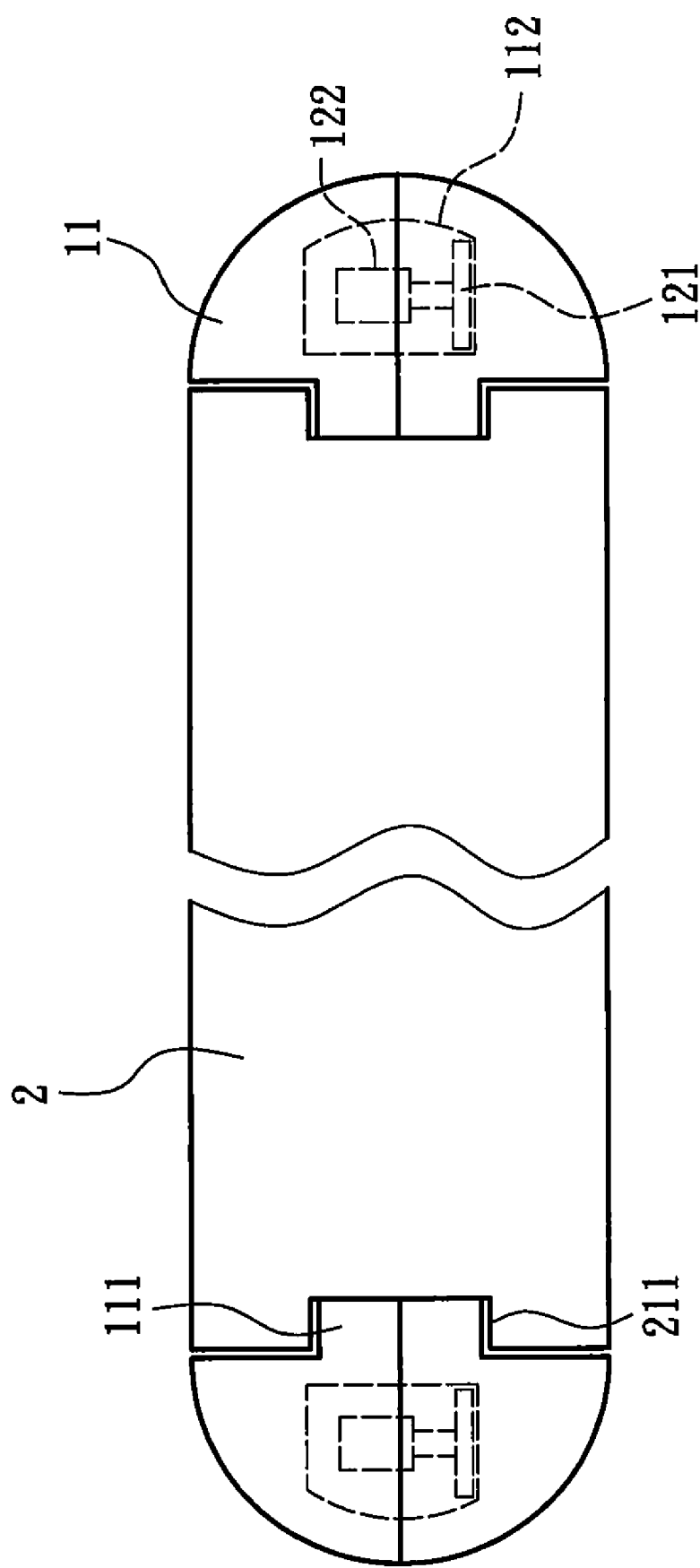
FIG. 3 is a schematic view of the present invention showing the positioning arms and wire winder in coupled condition-1.
Figure 4:
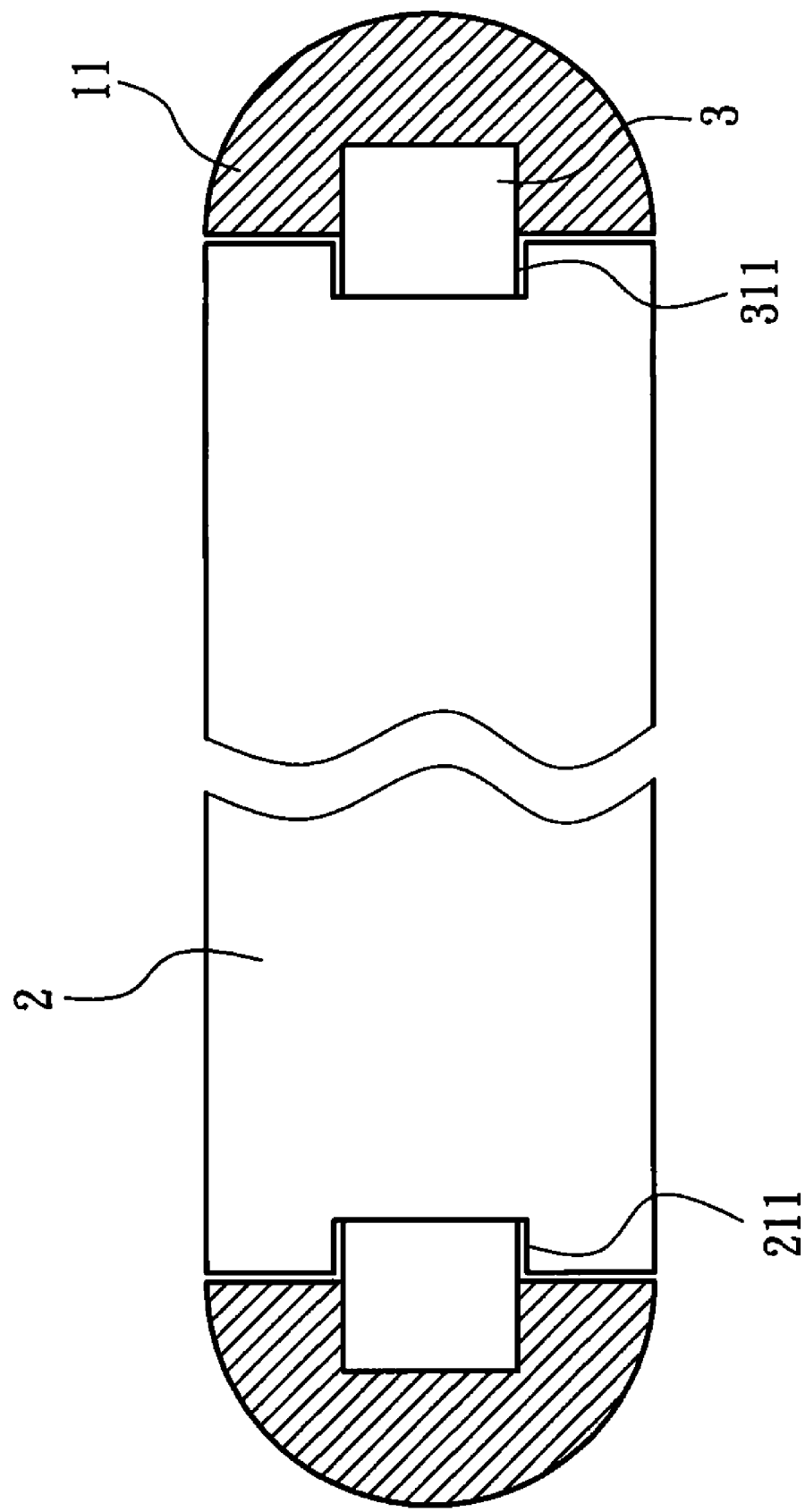
FIG. 4 is a schematic view of the present invention showing the positioning arms and wire winder in coupled condition-2.
Figure 5:
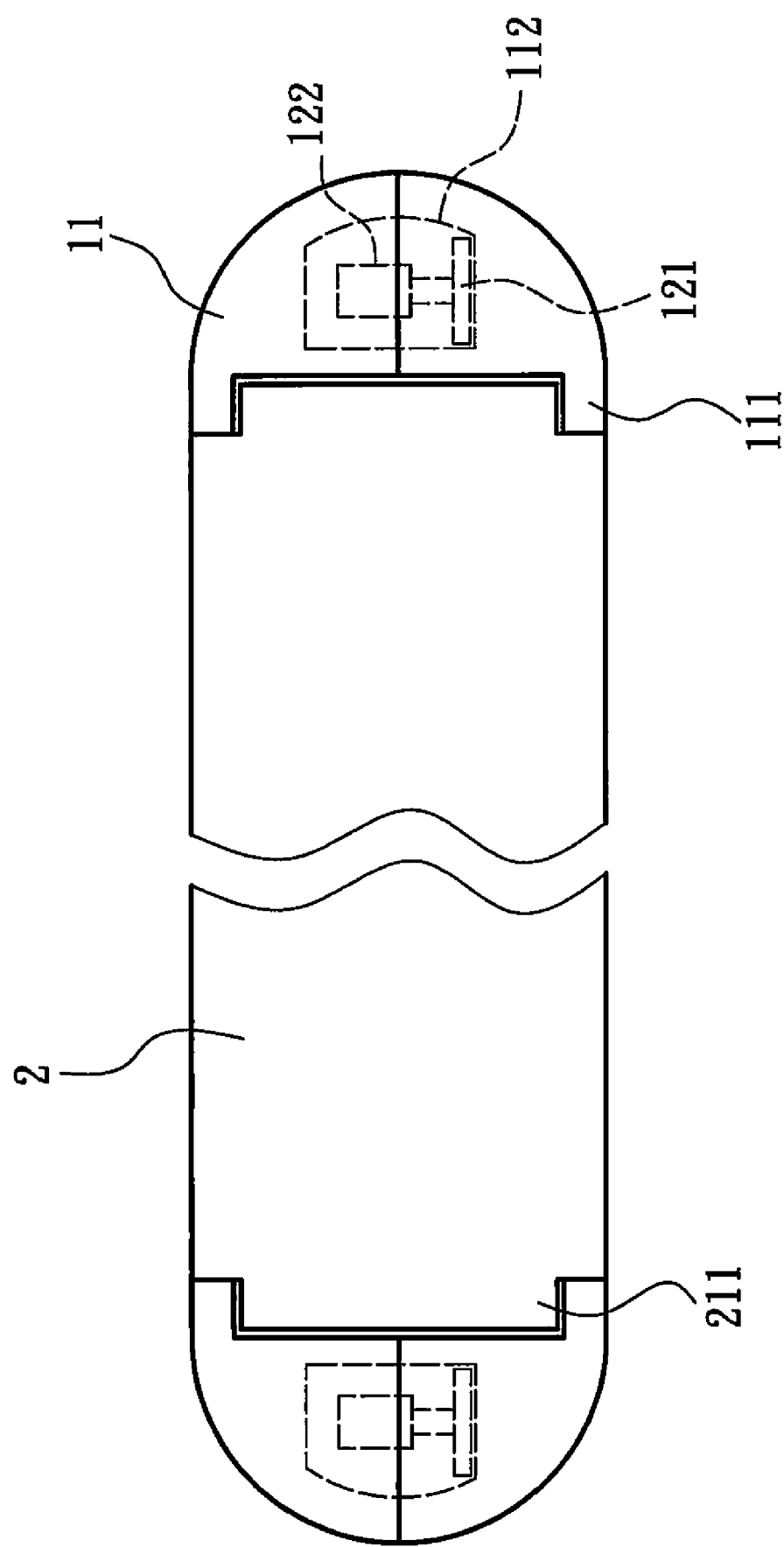
FIG. 5 is a schematic view of the present invention showing the positioning arms and wire winder in coupled condition-3.

Referring to FIG. 2, the two positioning arms 11, in addition to define the holding space to hold the wire winder 2, at least a portion or the entire body thereof can be made of metal (such as aluminum) to conduct heat of the conversion circuit 12 to perform cooling and reduce the temperature of the adapter when in use. Refer to FIG. 3, each of the positioning arms 11 has an extended laying space 112 communicating with the circuit laying space of the body 10. Also refer to FIGS. 2 and 3 for use condition of the extended laying space 112. The conversion circuit 12 may have an extended section 121 held in the extended laying space 112. The extended laying space 112 has enough room to accommodate circuit elements 122 of the extended section 112 such as capacitors, resistors, diodes or integrated circuits. Incorporated with the metallic positioning arms 11, the adapter provides a desired cooling effect. Refer to FIG. 4 for another use condition of the extended laying space 112. The positioning arms 11 may be made from plastics and hold a cooling set 3 in the extended laying space 112. The cooling set 3 is extended into the circuit laying space of the body 10 to contact with the conversion circuit 12 to conduct heat and disperse waste heat from the circuit laying space. Moreover, the positioning arms 11 have at least one opening to allow the cooling set 3 exposed on the surface thereof to enhance cooling effect. The exposed portion of the cooling set 3 outside the surface of the positioning arms 11 may also be formed directly a first directing portion 311 to guide returning of the wire winder 2. FIG. 5 illustrates another embodiment of the positioning arms 11, beside made from plastics or metal, the relative positions and shapes of the first and second directing portions 111 and 211 can also be altered. It is to be noted that the fashions of the first directing portions 111 and 311, and the second directing portion 211 previously discussed are not the limitations of the invention. This can be easily made by those skill in the art, thus shall also be included in the scope of the invention. By means of the positioning arms 11 which may be made of metal to facilitate heat conduction, a desirable heat conduction and cooling effect can be achieved for the adapter, and waste heat in the circuit laying space can be conducted to the positioning arms 11. The positioning arms 11 further can distribute the circuit elements 122 of the adapter to the extended laying space 112 to reduce energy density of the conversion circuit 12 and lower the temperature.

As a conclusion, the two positioning arms 11 of the adapter can provide the following benefits:
1. The wire winder 2 can be movably held between the two positioning arms 11.
2. The positioning arms 11 form an extended laying space 112 to hold the circuit elements 122 or cooling set 3.
3. The positioning arms 11 can be made of metal to provide good cooling effect.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An adapter equipped with a wire winding and holding apparatus, comprising:
   a circuit laying section which is located in a circuit laying space to hold a conversion circuit;
   a wire holding section containing a holding space; and a wire winder which is movably guided in the holding space and includes two conducting wire ends that are extensible and retractable and electrically connected to each other, one of the conducting wire ends being electrically connected to the conversion circuit;
   two positioning arms to define the holding space;
   the positioning arms include at least a portion made of heat conductive metal.

2. The adapter of claim 1 further comprising the wire winder being movably guided by the two positioning arms to escape or return to the holding space to be anchored.

3. The adapter of claim 2, wherein the positioning arms and the wire winder include respectively at least one first directing portion and at least one second directing portion at connecting sides thereof that are coupled with each other to guide the wire winder to slide into the holding space between the two positioning arms.

4. The adapter of claim 2, wherein the two positioning arms include respectively an extended laying space communicating with the circuit layer.

5. The adapter of claim 4, wherein the conversion circuit includes an extended section held in the extended laying space.

6. The adapter of claim 4, wherein the extended laying space holds a cooling set to conduct heat of the conversion circuit.

7. The adapter of claim 6, wherein the positioning arms include at least one opening to expose the cooling set outside the surface of the positioning arms.

* * * * *